United States Patent [19]

Coppa

[11] Patent Number: 5,350,569
[45] Date of Patent: Sep. 27, 1994

[54] STORAGE OF NUCLEAR MATERIALS BY ENCAPSULATION IN FULLERENES

[75] Inventor: Nicholas V. Coppa, Los Alamos, N. Mex.

[73] Assignee: The United States of America as represented by the United States Department of Energy, Washington, D.C.

[21] Appl. No.: 39,668

[22] Filed: Mar. 30, 1993

[51] Int. Cl.$^5$ ............................................. C01B 31/00
[52] U.S. Cl. ................................ 423/251; 423/445 B; 588/16
[58] Field of Search ........... 423/251, 250, 252, 445 B; 252/628, 626, 629, 635

[56] References Cited

U.S. PATENT DOCUMENTS

| H1013 | 1/1992 | Wormsbecher et al. | 252/629 |
| Re. 34,041 | 8/1992 | Doan | 252/628 |
| 5,256,338 | 10/1993 | Nishi et al. | 252/628 |
| 5,272,740 | 12/1993 | Marsaud et al. | 252/629 |
| 5,273,729 | 12/1993 | Howard et al. | 423/445 B |
| 5,275,705 | 1/1994 | Bethune et al. | 423/445 B |

Primary Examiner—Donald P. Walsh
Assistant Examiner—Frederick H. Voss
Attorney, Agent, or Firm—Milton D. Wyrick; William A. Eklund; William R. Moser

[57] ABSTRACT

A method of encapsulating radioactive materials inside fullerenes for stable long-term storage. Fullerenes provide a safe and efficient means of disposing of nuclear waste which is extremely stable with respect to the environment. After encapsulation, a radioactive ion is essentially chemically isolated from its external environment.

5 Claims, No Drawings

STORAGE OF NUCLEAR MATERIALS BY ENCAPSULATION IN FULLERENES

BACKGROUND OF THE INVENTION

The present invention relates generally to the field of waste disposal, and, more specifically, to the encapsulation and isolation of nuclear materials, including waste products, inside fullerenes. The invention is a result of a contract with the Department of Energy (Contract No. W-7405-ENG-36).

The disposal of nuclear materials, particularly nuclear waste materials created from sources such as nuclear power production, nuclear weapon programs, and medicine has plagued the nuclear power industry, as well as the scientific community, for decades. The facts that erected low level disposal sites have not opened, and that the current political climate does not favor the installation of new sites, indicate that the prospect for safe and adequate nuclear waste disposal in the near future is dim. This lack of disposal facilities will limit the future of nuclear power production at a time when a lowering of emissions from fossil fuel plants is needed.

With some nuclear isotopes having half lives of thousands of years, the need to provide especially stable storage facilities is clearly shown. However, natural features, such as ground water levels, soil characteristics and earthquake potential, make finding a suitable site extremely difficult, even when disregarding the political problems.

Examples of the problems involved with disposal is illustrated by the problems with the opening of the Waste Isolation Pilot Plant in New Mexico, and with the opposition mounted to development of the Yucca Mountain project in Nevada. With the increasing realization of the long term required for storage, and of the need to prevent escape of waste products into water supplies, renders the need for alternative safe disposal methods of paramount importance.

Recently, researchers have discovered a new form of carbon molecules known as "fullerenes." This discovery has sparked the interest of a large segment of the scientific community, and has led to the conception of numerous practical applications for the molecules. Some of the better known fullerenes include $C_{60}$(buckminsterfullerene) which has icosohedral symmetry, consisting of 12 five-membered rings and 20 six-membered rings, resembling the patchwork faces of a soccer ball; the ellipsoidally shaped $C_{70}$, and $C_{84}$; and the giant, spherically shaped $C_{256}$.

Studies of fullerenes have indicated that this material exhibits a remarkable range of physical and chemical properties. For example, various metal ions have been encapsulated within a fullerene cage. Also, fullerenes have been shown to have low density and unusually high thermal and mechanical stability, and have been generated with metals to form materials in which the metal ions are positioned inside the hollow fullerene cage.

With the current state of concern over the proper storage of nuclear materials, it would be of immeasurable benefit to be able to encapsulate such waste inside a stable molecule. Previous attempts at such binding have involved encapsulation within glasses, ceramics, or cements. In this encapsulation technology, each metal ion or cluster of ions is surrounded by relatively few matrix atoms. Additionally, the stability of such glasses is affected by the encapsulated material.

Because of radiation damage caused by the decay process, materials produced using the above methods suffer progressive degradation of the matrix molecular structure, allowing for the slow release of decay products, as well as the leaching of the parent isotope into the environment. This is not the case with fullerenes.

The remarkable stability of the fullerene cages will allow them to withstand the nuclear decay processes without severe degradation, assuring that the nuclear products will remain immobilized. Additionally, the fullerene molecules exhibit self-healing properties, meaning that in the event of a rupture, the partially broken cage will reclose. It is also likely that the synthesis of fullerene encapsulated metals can be carried out efficiently on a large scale, making the process attractive for nuclear waste disposal and storage. These features have led to the present invention, in which radioactive wastes are encapsulated within the fullerene molecule.

It is therefore an object of the present invention to provide a secure means for storage of radioactive materials.

It is another object of the present invention to provide a method for storing radioactive waste materials.

Additional objects, advantages and novel features of the invention will be set forth in part in the description which follows, and in part will become apparent to those skilled in the art upon examination of the following, or may be learned by practice of the invention. The objects and advantages of the present invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the present invention comprises a waste material encapsulated inside a fullerene molecule.

DETAILED DESCRIPTION

The present invention provides for the safe storage of nuclear materials inside the molecular structure of fullerenes as waste form. In the invention, uranium, plutonium or another radioactive waste product, is encapsulated inside the fullerene structure. This arrangement provides for extremely stable storage of the radioactive waste. Upon such encapsulation, a radioactive ion is chemically isolated from the external environment.

Additionally, because of the relatively low recoil energy of the radioactive decay fragments and the high number of modes in fullerene molecules available to dissipate that energy, the products from these nuclides will remain entrapped within the fullerene cage. The encapsulation of metal ions inside fullerenes has been previously demonstrated. However, the particular problem of fullerene encapsulation of plutonium or other radioactive material with high or low specific activity has not been addressed.

With fullerenes, each metal ion is isolated both from other metal ions, and from the chemical environment. In the case of $C_{60}$, each metal ion can be considered to be coordinated with 60 carbon atoms.

To accomplish this encapsulation, fullerenes or fullerides are produced by conventional means, most likely through a three-step process. This process involves first generating a fullerene-containing soot. Next, the fullerenes are extracted from the soot. Finally, the different fullerenes are separated. For encapsulation, the metal ions are introduced into the reaction zone during the generation of soot.

The step of soot generation and actinide encapsulation can be accomplished through various processes. One process is the consumption of composite graphite rods, which contain the actinide to be encapsulated, in an electrical arc in an inert atmosphere, such as helium or argon, and the simultaneous condensation if the resulting soot. Alternatively, fullerene encapsulated metals can be produced in sooting benzene flames, with the actinide vapor or halide vapor introduced into the flames, or by induction heating of composite rods with RF energy. An example of the benzene method is disclosed in "Combustion Synthesis of Fullerenes," J. T. McKinnon et al., *Combustion and Flame,* Vol. 88, pp. 102–112, 1992, which is included herein for all purposes. The RF energy method is disclosed in "A New Fullerene Synthesis," G. Peters et al., *Agnew. Chem. Int. Ed. Engl.,* Vol. 31, pp. 223–224, 1992, which is also included herein for all purposes.

The fullerene and encapsulated actinide fullerene extracts are extracted using toluene or other appropriate solvents. They could also be separated by gaseous diffusion or fractional sublimation, which should yield the processing of much greater volumes without the use of any solvents.

Perhaps the most important radioactive material to be encapsulated would be plutonium. However, other examples of radioactive materials are which could be encapsulated are all transuranic wastes, strontium, technetium, and thorium.

The foregoing description of the preferred embodiments of the invention have been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A waste product comprising:
   radioactive material encapsulated inside a fullerene molecule.

2. The waste product as described in claim 1, wherein said fullerene comprises the $C_{60}$ molecule.

3. The waste product as described in claim 1, wherein said radioactive material originates in metallic, oxide, or halide form.

4. The waste product as described in claim 1, wherein said radioactive material comprises plutonium.

5. The waste product as described in claim 1, wherein said radioactive material is selected from a group consisting of: all transuranic, strontium, technetium, and thorium wastes.

* * * * *